United States Patent
Hou et al.

(10) Patent No.: US 9,419,831 B2
(45) Date of Patent: Aug. 16, 2016

(54) METHOD AND MODEM FOR ADJUSTING MODULATION MODE

(71) Applicant: Huawei Technologies Co., Ltd., Shenzhen, Guangdong (CN)

(72) Inventors: Jianhui Hou, Chengdu (CN); Jun Li, Shenzhen (CN); Yi Lin, Madrid (ES); Fujun Gao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 14/227,978

(22) Filed: Mar. 27, 2014

(65) Prior Publication Data

US 2014/0294050 A1 Oct. 2, 2014

(30) Foreign Application Priority Data

Mar. 29, 2013 (CN) .......................... 2013 1 0108319

(51) Int. Cl.
| | |
|---|---|
| H04B 1/38 | (2015.01) |
| H04L 5/16 | (2006.01) |
| H04L 27/00 | (2006.01) |
| H04L 5/14 | (2006.01) |

(52) U.S. Cl.
CPC .......... H04L 27/0008 (2013.01); H04L 5/1453 (2013.01)

(58) Field of Classification Search
CPC ............ H04L 27/0008; H04L 27/0012; H04L 1/0025; H04L 1/00; H04L 1/0002; H04L 1/0006; H04L 1/0009
See application file for complete search history.

(56) References Cited

U.S. PATENT DOCUMENTS

| | | | |
|---|---|---|---|
| 5,550,881 A | 8/1996 | Sridhar et al. | |
| 6,185,199 B1 * | 2/2001 | Zehavi ................. | H04B 7/2628 370/335 |
| 6,507,827 B1 * | 1/2003 | Benson, Jr. ........... | H04L 1/0003 375/222 |
| 2004/0131030 A1 * | 7/2004 | Kuroyanagi ........... | H04J 13/00 370/335 |
| 2009/0060044 A1 * | 3/2009 | Suh ........................ | H04H 60/13 375/240.16 |
| 2009/0122767 A1 * | 5/2009 | Kwon .................... | H04L 69/324 370/337 |
| 2009/0219849 A1 * | 9/2009 | Alpert ................. | H04W 76/002 370/312 |
| 2009/0285339 A1 * | 11/2009 | Zhang ................. | H04J 13/0014 375/343 |
| 2010/0014570 A1 * | 1/2010 | Dupis .................... | H04B 17/15 375/224 |
| 2011/0134850 A1 * | 6/2011 | Kishigami ........... | H04B 7/0452 370/328 |
| 2015/0029844 A1 * | 1/2015 | Pathmasuntharam | H04W 28/22 370/230 |
| 2015/0280876 A1 * | 10/2015 | You ....................... | H04L 5/0048 370/329 |
| 2015/0288446 A1 * | 10/2015 | Yin ....................... | G02B 6/3895 398/28 |

* cited by examiner

*Primary Examiner* — Daniel Washburn
*Assistant Examiner* — Amneet Singh
(74) *Attorney, Agent, or Firm* — Leydig, Voit & Mayer, Ltd.

(57) ABSTRACT

The present invention provides a method and modem for adjusting a modulation mode. In embodiments of the present invention, a first modem generates indication information according to a current working first modulation mode, so that the first modem can send the indication information to a second modem through a data frame. Therefore, the second modem adjusts a current working second modulation mode of the second modem according to the indication information, so that the adjusted second modulation mode is consistent with the first modulation mode. Therefore, the problem of complex operations in the prior art, caused by that an operator configures a modulation mode of a second modem as a current working modulation mode of a peer modem, that is, a first modem, can be avoided, and efficiency of network deployment can be improved.

8 Claims, 3 Drawing Sheets

METHOD AND MODEM FOR ADJUSTING MODULATION MODE

CROSS-REFERENCE TO RELATED APPLICATION

The present invention claims priority to Chinese Patent Application No. 201310108319.1, filed on Mar. 29, 2013, which is hereby incorporated by reference in its entirety.

TECHNICAL FIELD

The present invention relates to a communications technology, and in particular, to a method and modem for adjusting a modulation mode.

BACKGROUND

With the development of communications technologies, a modem, which is a core chip in a communication device, is also being upgraded. Therefore, modems from several generations coexist in a communication network. A modem from a new generation needs to ensure effective compatibility with a modem from a previous generation; furthermore, an operator needs to configure a modulation mode of the modem from a new generation as a current working modulation mode of a peer modem, which means complex operations, and as a result, efficiency of network deployment is reduced.

SUMMARY

Multiple aspects of the present invention provide a method and modem for adjusting a modulation mode, which are used to improve efficiency of network deployment.

According to a first aspect, the present invention provides a method for adjusting a modulation mode, including: generating, by a first modem, indication information according to a current working first modulation mode; and sending, by the first modem, the indication information to a second modem through a data frame, so that the second modem adjusts a current working second modulation mode of the second modem according to the indication information, so that the adjusted second modulation mode is consistent with the first modulation mode, where the second modem supports two or more modulation modes, and among the two or more modulation modes, a modulation mode consistent with the first modulation mode is used as the adjusted second modulation mode.

With reference to the first aspect, in a first possible implementation manner of the first aspect, the sending, by the first modem, the indication information to a second modem through a data frame includes:

carrying, by the first modem, the indication information through a modulation mode field in a frame format of the data frame.

With reference to the first aspect or the first possible implementation manner of the first aspect, in a second possible implementation manner of the first aspect, the indication information includes: fixed data or a sequence.

With reference to the second possible implementation manner of the first aspect, in a third possible implementation manner of the first aspect, the carrying, by the first modem, the indication information through a modulation mode field in a frame format of the data frame includes:

when the indication information is fixed data, sending, by the first modem, the indication information to the second modem through at least one data frame, where the modulation mode field of each data frame carries the fixed data; or when the indication information is a sequence, sending, by the first modem, the indication information to the second modem through a plurality of data frames, where the number of the plurality of data frames is equal to the number of elements making up the sequence, and the modulation mode fields of the plurality of data frames carry one element making up the sequence, respectively.

With reference to the second possible implementation manner of the first aspect and the third possible implementation manner of the first aspect, in a fourth possible implementation manner of the first aspect, the sequence includes a pseudo random binary sequence, an arithmetic sequence, or a geometric sequence.

According to a second aspect, the present invention provides a method for adjusting a modulation mode, including: receiving, by a second modem, indication information sent, through a data frame, by a first modem; obtaining, by the second modem, a current working first modulation mode of the first modem according to the indication information; and adjusting, by the second modem, a current working second modulation mode of the second modem according to the first modulation mode, so that the adjusted second modulation mode is consistent with the first modulation mode, where the second modem supports two or more modulation modes, and among the two or more modulation modes, a modulation mode consistent with the first modulation mode is used as the adjusted second modulation mode.

With reference to the second aspect, in a first possible implementation manner of the second aspect, the indication information includes: fixed data or a sequence.

With reference to the first possible implementation manner of the second aspect, in a second possible implementation manner of the second aspect, the receiving, by a second modem, indication information sent, through a data frame, by a first modem includes:

when the indication information is fixed data, receiving, by the second modem, at least one data frame sent by the first modem, and detecting a modulation mode field of the at least one data frame to obtain the fixed data, where the modulation mode field of each data frame carries the fixed data; or when the indication information is a sequence, receiving, by the second modem, a plurality of data frames sent by the first modem, and jointly detecting modulation mode fields of the plurality of data frames to obtain the sequence, where the number of the plurality of data frames is equal to the number of elements making up the sequence, and the modulation mode fields of the plurality of data frames carry one element making up the sequence, respectively.

With reference to the first possible implementation manner of the second aspect and the second possible implementation manner of the second aspect, in a third possible implementation manner of the second aspect, the sequence includes a pseudo random binary sequence, an arithmetic sequence, or a geometric sequence.

According to a third aspect, the present invention provides a modem, including: a modulating/demodulating unit, configured to work in a first modulation mode; a generating unit, configured to generate indication information according to the current working first modulation mode of the modulating/demodulating unit, and transmit the indication information to a sending unit; and the sending unit, configured to send the indication information to a second modem through a data frame, so that the second modem adjusts a current working second modulation mode of the second modem according to the indication information, so that the adjusted second modulation mode is consistent with the first modulation mode, where the second modem supports two or more modulation modes, and among the two or more modulation modes, a modulation mode consistent with the first modulation mode is used as the adjusted second modulation mode.

With reference to the third aspect, in a first possible implementation manner of the third aspect, the sending unit is specifically configured to:

carry the indication information through a modulation mode field in a frame format of the data frame.

With reference to the third aspect and the first possible implementation manner of the third aspect, in a second possible implementation manner of the third aspect, the indication information includes: fixed data or a sequence.

With reference to the second possible implementation manner of the third aspect, in a third possible implementation manner of the third aspect, the indication information is fixed data, and the sending unit is specifically configured to send the indication information to the second modem through at least one data frame, where the modulation mode field of each data frame carries the fixed data.

With reference to the second possible implementation manner of the third aspect, in a fourth possible implementation manner of the third aspect, the indication information is a sequence, and the sending unit is specifically configured to send the indication information to the second modem through a plurality of data frames, where the number of the plurality of data frames is equal to the number of elements making up the sequence, and the modulation mode fields of the plurality of data frames carry one element making up the sequence, respectively.

With reference to the second possible implementation manner of the third aspect and the fourth possible implementation manner of the third aspect, in a fifth possible implementation manner of the third aspect, the sequence includes a pseudo random binary sequence, an arithmetic sequence, or a geometric sequence.

According to a fourth aspect, the present invention provides a modem, including: a receiving unit, configured to receive indication information sent, through a data frame, by a first modem, and transmit the indication information to an obtaining unit; the obtaining unit, configured to obtain a current working first modulation mode of the first modem according to the indication information; a modulating/demodulating unit, configured to support two or more modulation modes, where at least one modulation mode among the two or more modulation modes is consistent with the first modulation mode; and an adjusting unit, configured to adjust a current working second modulation mode of the modem according to the first modulation mode obtained by the obtaining unit, so that among the two or more modulation modes, a modulation mode consistent with the first modulation mode is used as the adjusted second modulation mode.

With reference to the fourth aspect, in a first possible implementation manner of the fourth aspect, the indication information includes: fixed data or a sequence.

With reference to the first possible implementation manner of the fourth aspect, in a second possible implementation manner of the fourth aspect, the indication information is fixed data, and the receiving unit is specifically configured to:

receive at least one data frame sent by the first modem, and detect a modulation mode field of the at least one data frame to obtain the fixed data, where the modulation mode field of each data frame carries the fixed data.

With reference to the first possible implementation manner of the fourth aspect, in a third possible implementation manner of the fourth aspect, the indication information is a sequence, and the receiving unit is specifically configured to:

receive a plurality of data frames sent by the first modem, and jointly detect modulation mode fields of the plurality of data frames to obtain the sequence, where the number of the plurality of data frames is equal to the number of elements making up the sequence, and the modulation mode fields of the plurality of data frames carry one element making up the sequence, respectively.

With reference to the first possible implementation manner of the fourth aspect and the third possible implementation manner of the fourth aspect, in a fourth possible implementation manner of the fourth aspect, the sequence includes a pseudo random binary sequence, an arithmetic sequence, or a geometric sequence.

As seen from the above technical solutions, in the embodiments of the present invention, a first modem generates indication information according to a current working first modulation mode, so that the first modem can send the indication information to a second modem through a data frame. Therefore, the second modem adjusts a current working second modulation mode of the second modem according to the indication information, so that the adjusted second modulation mode is consistent with the first modulation mode. An operator is no longer required to configure the modulation mode of the second modem as a current working modulation mode of a peer modem, that is, the first modem. Therefore, the problem of complex operations in the prior art, caused by that an operator configures a modulation mode of a second modem as a current working modulation mode of a peer modem, that is, a first modem, can be avoided, and efficiency of network deployment can be improved.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In addition, the term "and/or" in this document is only to describe an association between associated objects, and represents that three relationships may exist, for example, A and/or B may represent the following three cases: A exists separately, both A and B exist, and B exists separately. In addition, the symbol "/" in this document usually represents that the associated objects before and after the symbol are in an "or" relationship.

Figure 1:
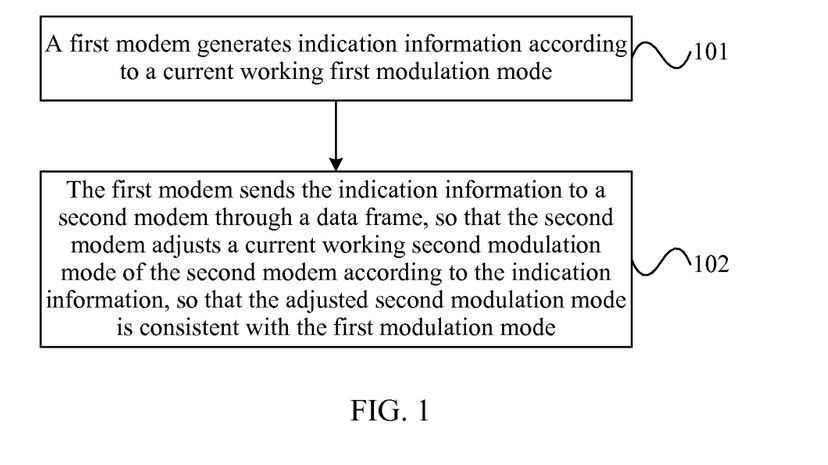
FIG. 1 is a schematic flowchart of a method for adjusting a modulation mode according to an embodiment of the present invention.

FIG. 1 is a schematic flowchart of a method for adjusting a modulation mode according to an embodiment of the present invention. As shown in FIG. 1, the method comprises:

101. A first modem generates indication information according to a current working first modulation mode.

The indication information may be fixed data or a sequence.

102. The first modem sends the indication information to a second modem through a data frame, so that the second modem adjusts a current working second modulation mode of the second modem according to the indication information, so that the adjusted second modulation mode is consistent with the first modulation mode.

The second modem supports two or more modulation modes, and among the two or more modulation modes, a modulation mode consistent with the first modulation mode is used as the adjusted second modulation mode.

Specifically, if the current working second modulation mode of the second modem is consistent with the current working first modulation mode of the first modem, the second modem does not need to perform the adjustment operation; and if the current working second modulation mode of the second modem is inconsistent with the current working first modulation mode of the first modem, the second modem can adjust the current working second modulation mode of the second modem, so that the adjusted second modulation mode is consistent with the first modulation mode.

It may be understood that a modulation mode of the second modem in this embodiment needs to include a modulation mode of the first modem. It may be understood that a chip function of the second modem needs to be compatible with a chip function of the first modem and a chip function of the first modem from a next generation or several next generations.

Specifically, the first modem uses an $N^{th}$ generation modulation chip technology, and the second modem uses an $(N+i)^{th}$ generation modulation chip technology, where N is a positive integer and i is a natural number. For example, the first modem uses a first generation modulation chip technology and supports only a 256 quadrature amplitude modulation (QAM) modulation mode, while a second modem uses a second or later generation modulation chip technology and supports a 2048 QAM modulation mode, and also modulation modes such as 256 QAM, 512 QAM, and 1024 QAM. It should be noted that a modulation technology of the modem includes, but is not limited to, frequency shift keying (FSK), amplitude shift keying (ASK), phase shift keying (PSK), trellis coded modulation (TCM), or QAM, and so on. Only QAM is described in this embodiment, which is not used to limit the present invention. Alternatively, for another example, the first modem uses a second generation modulation chip technology, and the second modem uses a third or later generation modulation chip technology. Persons skilled in the art can understand that a technology update of a modem in each generation is related to the order of a modulation mode of the modem.

It should be noted that the first modem or the second modem may be located in a communication device, for example, a mobile phone or a base station.

Optionally, in a possible implementation manner of this embodiment, the modulation mode of the second modem before the adjustment is a supportable modulation mode selected by the second modem by polling.

Specifically, the second modem may further obtain configured polling information, so that the second modem selects a supportable modulation mode by polling as the modulation mode of the second modem before the adjustment.

It should be noted that the definition of "selecting a supportable modulation mode by polling" in this embodiment may be understood as actively selecting a supportable modulation mode periodically, or may also be understood as actively selecting a supportable modulation mode within a specified time.

For example, an operator can pre-configure a supportable modulation mode and configured polling information for the second modem according to the type of the second modem. For example, when a second generation modem is used as the second modem, a modulation mode of the second modem may be configured as a modulation mode of a first generation modem or a modulation mode of the second generation modem; and the configured polling information is set as a polling interval of 5 minutes.

Optionally, in a possible implementation manner of this embodiment, in 102, the first modem may specifically carry the indication information through a modulation mode field in a frame format of the data frame.

Optionally, in a possible implementation manner of this embodiment, the indication information may be fixed data, for example, 0X55. When the indication information is fixed data, in 102, the first modem may specifically send the indication information to the second modem through at least one data frame, where the modulation mode field of each data frame carries the fixed data.

Optionally, in a possible implementation manner of this embodiment, to avoid the problem of in-band flatness increase caused by periodicity of a field of a fixed value, the indication information may be a sequence. The sequence includes a pseudo random binary sequence (PRBS), an arithmetic sequence, or a geometric sequence. When the indication information is a sequence, in 102, the first modem may specifically send the indication information to the second modem through a plurality of data frames, where the number of the plurality of data frames is equal to the number of elements making up the sequence, and the modulation mode fields of the plurality of data frames carry one element making up the sequence, respectively.

It should be noted that each data frame carries only one element.

For example, assuming that the sequence is pre-configured as a PRBS, the first modem specifically can consecutively send a first data frame B1, a second data frame B2, a third data frame B3, . . . , and an $n^{th}$ data frame Bn to the second modem, where indication information included in the n data frames may make up a PRBS, that is, PRBS1, where the PRBS1 corresponds to the current working first modulation mode of the first modem, so that the second modem determines the current working first modulation mode of the first modem according to the indication information.

For another example, assuming that the sequence is pre-configured as an arithmetic sequence, the first modem specifically can consecutively send a first data frame B1, a second data frame B2, a third data frame B3, . . . , and an $n^{th}$ data frame Bn to the second modem, where indication information included in the n data frames may make up an arithmetic sequence, that is, an arithmetic sequence whose step is A, where the arithmetic sequence whose step is A corresponds to the current working first modulation mode of the first modem, so that the second modem determines the current working first modulation mode of the first modem according to the indication information.

In this embodiment, a first modem generates indication information according to a current working first modulation mode, so that the first modem can send the indication information to a second modem through a data frame. Therefore, the second modem adjusts a current working second modulation mode of the second modem according to the indication information, so that the adjusted second modulation mode is consistent with the first modulation mode. An operator is no longer required to configure the modulation mode of the second modem as a current working modulation mode of a peer modem, that is, the first modem. Therefore, the problem of complex operations in the prior art, caused by that an operator configures a modulation mode of a second modem as a current working modulation mode of a peer modem, that is, a first modem, can be avoided, and efficiency of network deployment can be improved.

In addition, the technical solution provided by the present invention can effectively ensure reliability of network deployment.

Figure 2:
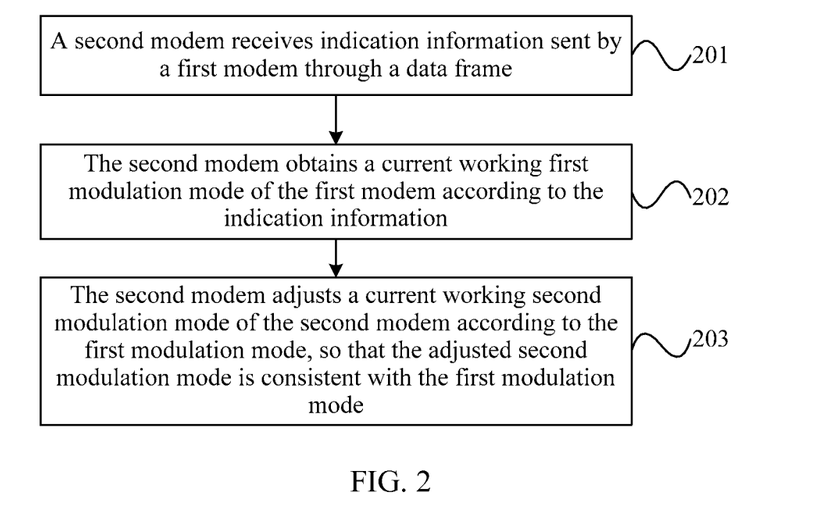
FIG. 2 is a schematic flowchart of a method for adjusting a modulation mode according to another embodiment of the present invention.

FIG. 2 is a schematic flowchart of a method for adjusting a modulation mode according to another embodiment of the present invention. As shown in FIG. 2:

201. A second modem receives indication information sent, through a data frame, by a first modem.

The indication information may be fixed data or a sequence.

202. The second modem obtains a current working first modulation mode of the first modem according to the indication information.

203. The second modem adjusts a current working second modulation mode of the second modem according to the first modulation mode, so that the adjusted second modulation mode is consistent with the first modulation mode.

The second modem supports two or more modulation modes, and among the two or more modulation modes, a modulation mode consistent with the first modulation mode is used as the adjusted second modulation mode.

Specifically, if the current working second modulation mode of the second modem is consistent with the current working first modulation mode of the first modem, the second modem does not need to perform the adjustment operation; and if the current working second modulation mode of the second modem is inconsistent with the current working first modulation mode of the first modem, the second modem can adjust the current working second modulation mode of the second modem, so that the adjusted second modulation mode is consistent with the first modulation mode.

It may be understood that a modulation mode of the second modem in this embodiment needs to include a modulation mode of the first modem. It may be understood that a chip function of the second modem needs to include a chip function of the first modem and a chip function of the first modem from a next generation or several next generations.

Specifically, the first modem uses an $N^{th}$ generation modulation chip technology, and the second modem uses an $(N+i)^{th}$ generation modulation chip technology, where N is a positive integer and i is a natural number. For example, the first modem uses a first generation modulation chip technology and supports only a 256 QAM modulation mode, while a second modem uses a second or later generation modulation chip technology and supports a 2048 QAM modulation mode, and also modulation modes such as 256 QAM, 512 QAM, and 1024 QAM. It should be noted that a modulation technology of the modem includes, but is not limited to, FSK, ASK, PSK, TCM, or QAM, and so on. Only QAM is described in this embodiment, which is not used to limit the present invention. Alternatively, for another example, the first modem uses a second generation modulation chip technology, and the second modem uses a third or later generation modulation chip technology.

It should be noted that the first modem or the second modem may be located in a communication device, for example, a mobile phone or a base station.

Optionally, in a possible implementation manner of this embodiment, before 201, the second modem can further select a supportable modulation mode by polling as the modulation mode of the second modem before the adjustment.

Specifically, the second modem can obtain configured polling information, so that the second modem selects a supportable modulation mode by polling as the modulation mode of the second modem before the adjustment.

It should be noted that the definition of "selecting a supportable modulation mode by polling" mentioned in this embodiment may be understood as actively selecting a supportable modulation mode periodically, or may also be understood as actively selecting a supportable modulation mode within a specified time.

For example, an operator can pre-configure a supportable modulation mode and configured polling information for the second modem according to the type of the second modem. For example, when a second generation Modem is used as the second modem, a modulation mode of the second modem may be configured as a modulation mode of a first generation Modem or a modulation mode of the second generation Modem; and the configured polling information is set as a polling interval of 5 minutes.

Optionally, in a possible implementation manner of this embodiment, the indication information may be fixed data, for example, 0X55. When the indication information is fixed data, in 201, the second modem may specifically receive at least one data frame sent by the first modem, and detect a modulation mode field of the at least one data frame to obtain the fixed data, where the modulation mode field of each data frame carries the fixed data.

Optionally, in a possible implementation manner of this embodiment, to avoid the problem of in-band flatness increase caused by periodicity of a field of a fixed value, the indication information may be a sequence. The sequence includes a pseudo random binary sequence (PRBS), an arithmetic sequence, or a geometric sequence. When the indication information is a sequence, in 201, the second modem may specifically receive a plurality of data frames sent by the first modem, and jointly detect modulation mode fields of the plurality of data frames to obtain the sequence, where the number of the plurality of data frames is equal to the number of elements making up the sequence, and the modulation mode fields of the plurality of data frames carry one element making up the sequence, respectively.

It should be noted that each data frame carries only one element.

For example, assuming that the sequence is pre-configured as a PRBS, the first modem specifically can consecutively send a first data frame B1, a second data frame B2, a third data frame B3, . . . , and an n.sup.th data frame Bn to the second modem, where indication information included in the n data frames may make up a PRBS, that is, PRBS1, where the PRBS1 corresponds to the current working first modulation mode of the first modem, so that the second modem determines the current working first modulation mode of the first modem according to the indication information.

For another example, assuming that the sequence is pre-configured as an arithmetic sequence, the first modem specifically can consecutively send a first data frame B1, a second data frame B2, a third data frame B3, . . . , and an $n^{th}$ data frame Bn to the second modem, where indication information included in the n data frames may make up an arithmetic sequence, that is, an arithmetic sequence whose step is A, where the arithmetic sequence whose step is A corresponds to the current working first modulation mode of the first modem, so that the second modem determines the current working first modulation mode of the first modem according to the indication information.

In this embodiment, a second modem receives indication information sent, through a data frame, by a first modem, so that the second modem can adjust a current working second modulation mode of the second modem according to the indication information, so that the adjusted second modulation mode is consistent with the first modulation mode. An operator is no longer required to configure the modulation mode of the second modem as a current working modulation mode of a peer modem, that is, the first modem. Therefore, the problem of complex operations in the prior art, caused by that an operator configures a modulation mode of a second modem as a current working modulation mode of a peer modem, that is, a first modem, can be avoided, and efficiency of network deployment can be improved.

In addition, the technical solution provided by the present invention can effectively ensure reliability of network deployment.

It should be noted that, for ease of description in the method embodiments above, the method is described as a series of actions. Persons skilled in the art are aware that the actions are not limited by the sequence described herein and may occur in other sequences or occur simultaneously. In addition, persons skilled in the art should understand that the embodiments described in the specification are exemplary embodiments and actions and modules involved in these embodiments are not necessarily required for the present invention.

In the foregoing embodiments, each embodiment has its emphasis. What is not detailed in one embodiment is detailed in the related description of another embodiment.

Figure 3:
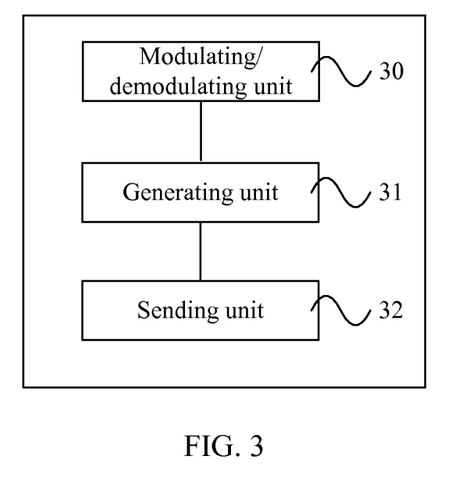
FIG. 3 is a schematic structural diagram of a modem according to another embodiment of the present invention.

FIG. 3 is a schematic structural diagram of a modem (i.e., the first modem) according to another embodiment of the present invention. As shown in FIG. 3, the modem of this embodiment may include a modulating/demodulating unit 30, a generating unit 31, and a sending unit 32. The modulating/demodulating unit 30 is configured to work in a first modulation mode; the generating unit 31 is configured to generate indication information according to a current working first modulation mode of the modulating/demodulating unit 30, and transmit the indication information to the sending unit 32; and the sending unit 32 is configured to send the indication information to a second modem through a data frame, so that the second modem adjusts a current working second modulation mode of the second modem according to the indication information, so that the adjusted second modulation mode is consistent with the first modulation mode. The second modem supports two or more modulation modes, and among the two or more modulation modes, a modulation mode consistent with the first modulation mode is used as the adjusted second modulation mode.

The indication information may be fixed data or a sequence.

Specifically, if the current working second modulation mode of the second modem is consistent with the current working first modulation mode of the modem, the second modem does not need to perform the adjustment operation; and if the current working second modulation mode of the second modem is inconsistent with the current working first modulation mode of the modem, the second modem can adjust the current working second modulation mode of the second modem, so that the adjusted second modulation mode is consistent with the first modulation mode.

It may be understood that a modulation mode of the second modem in this embodiment needs to include a modulation mode of the modem. It may be understood that a chip function of the second modem needs to include a chip function of the modem and a chip function of the modem from a next generation or several next generations Specifically, the modem uses an $N^{th}$ generation modulation chip technology, and the second modem uses an $(N+i)^{th}$ generation modulation chip technology. For example, a modem uses a first generation modulation chip technology and supports only a 256 QAM modulation mode, while a second modem uses a second or later generation modulation chip technology and supports a 2048 QAM modulation mode, and also modulation modes such as 256 QAM, 512 QAM, and 1024 QAM. It should be noted that a modulation technology of the modem includes, but is not limited to, FSK, ASK, PSK, TCM, or QAM, and so on. Only QAM is described in this embodiment, which is not used to limit the present invention. Alternatively, for another example, the modem uses a second generation modulation chip technology, and the second modem uses a third or later generation modulation chip technology.

It should be noted that the modem or the second modem may be located in a communication device, for example, a mobile phone or a base station.

Optionally, in a possible implementation manner of this embodiment, the modulation mode of the second modem before the adjustment is a supportable modulation mode selected by the second modem by polling.

Specifically, the second modem may further obtain configured polling information, so that the second modem selects a supportable modulation mode by polling as the modulation mode of the second modem before the adjustment.

It should be noted that the definition of "selecting a supportable modulation mode by polling" mentioned in this embodiment may be understood as actively selecting a supportable modulation mode periodically, or may also be understood as actively selecting a supportable modulation mode within a specified time.

For example, an operator can pre-configure a supportable modulation mode and configured polling information for the second modem according to the type of the second modem. For example, when a second generation Modem is used as the second modem, a modulation mode of the second modem may be configured as a modulation mode of a first generation Modem or a modulation mode of the second generation Modem; and the configured polling information is set as a polling interval of 5 minutes.

Optionally, in a possible implementation manner of this embodiment, the sending unit 32 may specifically carry the indication information through a modulation mode field in a frame format of the data frame.

Optionally, in a possible implementation manner of this embodiment, the indication information may be fixed data, for example, 0X55. When the indication information is fixed data, the sending unit 32 may specifically send the indication information to the second modem through at least one data frame, where the modulation mode field of each data frame carries the fixed data.

Optionally, in a possible implementation manner of this embodiment, to avoid the problem of in-band flatness increase caused by periodicity of a field of a fixed value, the indication information may be a sequence. The sequence includes a pseudo random binary sequence (PRBS), an arithmetic sequence, or a geometric sequence. When the indication information is a sequence, the sending unit 32 may specifically send the indication information to the second modem through a plurality of data frames, where the number of the plurality of data frames is equal to the number of elements making up the sequence, and the modulation mode fields of the plurality of data frames carry one element making up the sequence, respectively.

It should be noted that each data frame carries only one element.

For example, assuming that the sequence is pre-configured as a PRBS, the sending unit 32 specifically can consecutively send a first data frame B1, a second data frame B2, a third data frame B3, . . . , and an $n^{th}$ data frame Bn to the second modem, where indication information included in the n data frames may make up a PRBS, that is, PRBS1, where the PRBS1 corresponds to the current working modulation mode of the modem, so that the second modem determines the current working modulation mode of the modem according to the indication information.

For another example, assuming that the sequence is pre-configured as an arithmetic sequence, the sending unit 32 specifically can consecutively send a first data frame B1, a second data frame B2, a third data frame B3, . . . , and an $n^{th}$ data frame Bn to the second modem, where indication information included in the n data frames may make up an arithmetic sequence, that is, an arithmetic sequence whose step is A, where the arithmetic sequence whose step is A corresponds to the current working modulation mode of the modem, so that the second modem determines the current working modulation mode of the modem according to the indication information.

In this embodiment, a modem generates indication information according to a current working first modulation mode with a generating unit, so that a sending unit can send the indication information to a second modem through a data frame. Therefore, the second modem adjusts a current working second modulation mode of the second modem according to the indication information, so that the adjusted second modulation mode is consistent with the first modulation mode. An operator is no longer required to configure the modulation mode of the second modem as a current working modulation mode of a peer modem, that is, the modem. Therefore, the problem of complex operations in the prior art, caused by that an operator configures a modulation mode of a second modem as a current working modulation mode of a peer modem, that is, a modem, can be avoided, and efficiency of network deployment can be improved.

In addition, the technical solution provided by the present invention can effectively ensure reliability of network deployment.

Figure 4:
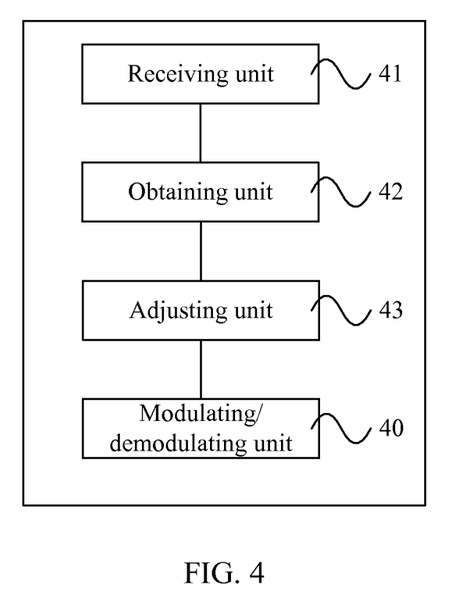
FIG. 4 is a schematic structural diagram of a modem according to another embodiment of the present invention.

FIG. 4 is a schematic structural diagram of a modem (i.e., the second modem) according to another embodiment of the present invention. As shown in FIG. 4, the modem of this embodiment may include a receiving unit 41, an obtaining unit 42, a modulating/demodulating unit 40, and an adjusting unit 43. The receiving unit 41 is configured to receive indication information sent, through a data frame, by a first modem, and transmit the indication information to the obtaining unit 42; the obtaining unit 42 is configured to obtain a current working first modulation mode of the first modem according to the indication information; the modulating/demodulating unit 40 is configured to support two or more modulation modes, where at least one modulation mode among the two or more modulation modes is consistent with the first modulation mode; and the adjusting unit 43 is configured to adjust a modulation mode of the modem according to the first modulation mode obtained by the obtaining unit 42, so that the adjusted modulation mode of the modem is consistent with the current working first modulation mode of the first modem.

The indication information may be fixed data or a sequence.

Specifically, if the current working second modulation mode of the modem is consistent with the current working first modulation mode of the first modem, the adjusting unit 43 does not need to perform the adjustment operation; and if the current working second modulation mode of the modem is inconsistent with the current working first modulation mode of the first modem, the adjusting unit 43 can adjust the modulation mode of the modem, so that the adjusted second modulation mode is consistent with the current working first modulation mode of the first modem.

It may be understood that a modulation mode of the modem in this embodiment needs to include a modulation mode of the first modem. It may be understood that a chip function of the modem needs to include a chip function of the first modem and a chip function of the first modem from a next generation or next several generations.

Specifically, the first modem uses an $N^{th}$ generation modulation chip technology, and the modem uses an $(N+i)^{th}$ generation modulation chip technology, where N is a positive integer and i is a natural number. For example, the first modem uses a first generation modulation chip technology and supports only a 256 QAM modulation mode, while a modem uses a second or later generation modulation chip technology and supports a 2048 QAM modulation mode, and also modulation modes such as 256 QAM, 512 QAM, and 1024 QAM. It should be noted that a modulation technology of the modem includes, but is not limited to, FSK, ASK, PSK, TCM, or QAM, and so on. Only QAM is described in this embodiment, which is not used to limit the present invention. Alternatively, for another example, the first modem uses a second generation modulation chip technology, and the modem uses a third or later generation modulation chip technology.

It should be noted that the first modem or the modem may be located in a communication device, for example, a mobile phone or a base station.

Optionally, in a possible implementation manner of this embodiment, the adjusting unit 43 may be further configured to select a supportable modulation mode by polling as the modulation mode of the modem before the adjustment.

Specifically, the adjusting unit 43 may obtain configured polling information, so that the adjusting unit 43 selects a supportable modulation mode by polling as the modulation mode of the modem before the adjustment.

It should be noted that the definition of "selecting a supportable modulation mode by polling" mentioned in this embodiment may be understood as actively selecting a supportable modulation mode periodically, or may also be understood as actively selecting a supportable modulation mode within a specified time.

For example, an operator can pre-configure a supportable modulation mode and configured polling information for a modem according to the type of the modem. For example, when a second generation Modem is used as the modem, the operator can configure a modulation mode of the modem as a modulation mode of a first generation Modem or a modulation mode of the second generation Modem; and set the configured polling information as a polling interval of 5 minutes.

Optionally, in a possible implementation manner of this embodiment, the indication information may be fixed data, for example, 0X55. When the indication information is fixed data, the receiving unit 41 may be specifically configured to receive at least one data frame sent by the first modem, and detect a modulation mode field of the at least one data frame to obtain the fixed data, where the modulation mode field of each data frame carries the fixed data.

Optionally, in a possible implementation manner of this embodiment, to avoid the problem of in-band flatness increase caused by periodicity of a field of a fixed value, the indication information may be a sequence. The sequence includes a pseudo random binary sequence (Pseudo Random Binary Sequence, PRBS), an arithmetic sequence, or a geometric sequence. When the indication information is a sequence, the receiving unit 41 may be specifically configured to receive a plurality of data frames sent by the first modem, and jointly detect modulation mode fields of the plurality of data frames to obtain the sequence, where the number of the plurality of data frames is equal to the number of elements making up the sequence, and the modulation mode fields of the plurality of data frames carry one element making up the sequence, respectively.

It should be noted that each data frame carries only one element.

For example, assuming that the sequence is pre-configured as a PRBS, the first modem specifically can consecutively send a first data frame B1, a second data frame B2, a third data frame B3, . . . , and an $n^{th}$ data frame Bn to the modem, where indication information included in the n data frames may make up a PRBS, that is, PRBS1, where the PRBS1 corresponds to the current working first modulation mode of the first modem, so that the modem determines the current working first modulation mode of the first modem according to the indication information.

For another example, assuming that the sequence is pre-configured as an arithmetic sequence, the first modem specifically can consecutively send a first data frame B1, a second data frame B2, a third data frame B3, . . . , and an $n^{th}$ data frame Bn to the modem, where indication information included in the n data frames may make up an arithmetic sequence, that is, an arithmetic sequence whose step is A, where the arithmetic sequence whose step is A corresponds to the current working first modulation mode of the first modem, so that the modem determines the current working first modulation mode of the first modem according to the indication information.

In this embodiment, a modem receives, with a receiving unit, indication information sent, through a data frame, by a first modem, so that an adjusting unit can adjust a modulation mode of the modem according to the indication information, so that the adjusted modulation mode of the modem is consistent with the current working first modulation mode of the first modem. An operator is no longer required to configure the modulation mode of the modem as a current working modulation mode of a peer modem, that is, the first modem. Therefore, the problem of complex operations in the prior art, caused by that an operator configures a modulation mode of a modem as a current working modulation mode of a peer modem, that is, a first modem, can be avoided, and efficiency of network deployment can be improved. In addition, the technical solution provided by the present invention can effectively ensure reliability of network deployment.

Figure 5:
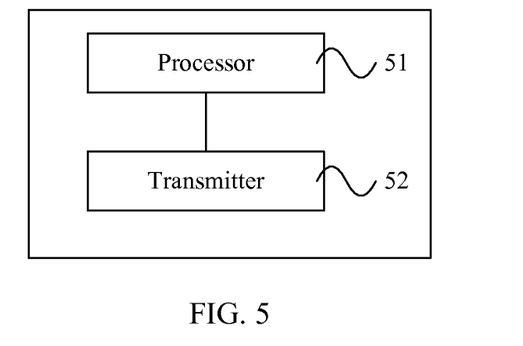
FIG. 5 is a schematic structural diagram of a modem according to another embodiment of the present invention.

FIG. 5 is a schematic structural diagram of a modem (i.e., the first modem) according to another embodiment of the present invention. As shown in FIG. 5, the modem of this embodiment may include a processor 51 and a sender 52. The processor 51 is configured to: work in a first modulation mode; determine a current working modulation mode, where the modulation mode is related to a chip function; generate indication information according to the current working first modulation mode; and transmit the indication information to the sender 52. The sender 52 is configured to send the indication information to a second modem through a data frame, so that the second modem adjusts a current working second modulation mode of the second modem according to the indication information, so that the adjusted second modulation mode is consistent with the first modulation mode. The second modem supports two or more modulation modes, and among the two or more modulation modes, a modulation mode consistent with the first modulation mode is used as the adjusted second modulation mode.

The indication information may be fixed data or a sequence.

Specifically, if the current working second modulation mode of the second modem is consistent with the current working first modulation mode of the modem, the second modem does not need to perform the adjustment operation; and if the current working second modulation mode of the second modem is inconsistent with the current working first modulation mode of the modem, the second modem can adjust the current working second modulation mode of the second modem, so that the adjusted second modulation mode is consistent with the first modulation mode.

It may be understood that a modulation mode of the second modem in this embodiment needs to include a modulation mode of the modem. It may be understood that a chip function of the second modem needs to include a chip function of the modem and a chip function of the modem from a next generation or several next generations.

Specifically, the modem uses an $N^{th}$ generation modulation chip technology, and the second modem uses an $(N+i)^{th}$ generation modulation chip technology, where N is a positive integer and i is a natural number. For example, a modem uses a first generation modulation chip technology and supports only a 256 QAM modulation mode, while a second modem uses a second or later generation modulation chip technology and supports a 2048 QAM modulation mode, and also modulation modes such as 256 QAM, 512 QAM, and 1024 QAM. It should be noted that a modulation technology of the modem includes, but is not limited to, FSK, ASK, PSK, TCM, or QAM, and so on. Only QAM is described in this embodiment, which is not used to limit the present invention. Alternatively, for another example, the modem uses a second generation modulation chip technology, and the second modem uses a third or later generation modulation chip technology.

It should be noted that the modem or the second modem may be located in a communication device, for example, a mobile phone or a base station.

Optionally, in a possible implementation manner of this embodiment, the modulation mode of the second modem before the adjustment is a supportable modulation mode selected by the second modem by polling.

Specifically, the second modem may further obtain configured polling information, so that the second modem selects a supportable modulation mode by polling as the modulation mode of the second modem before the adjustment.

It should be noted that the definition of "selecting a supportable modulation mode by polling" mentioned in this embodiment may be understood as actively selecting a supportable modulation mode periodically, or may also be understood as actively selecting a supportable modulation mode within a specified time.

For example, an operator can pre-configure a supportable modulation mode and configured polling information for the second modem according to the type of the second modem. For example, when a second generation Modem is used as the second modem, a modulation mode of the second modem may be configured as a modulation mode of a first generation Modem or a modulation mode of the second generation Modem; and the configured polling information is set as a polling interval of 5 minutes.

Optionally, in a possible implementation manner of this embodiment, the sender 52 may specifically carry the indication information through a modulation mode field in a frame format of the data frame.

Optionally, in a possible implementation manner of this embodiment, the indication information may be fixed data, for example, 0X55. When the indication information is fixed data, the sender 52 may specifically send the indication information to the second modem through at least one data frame, where the modulation mode field of each data frame carries the fixed data.

Optionally, in a possible implementation manner of this embodiment, to avoid the problem of in-band flatness increase caused by periodicity of a field of a fixed value, the indication information may be a sequence. The sequence includes a pseudo random binary sequence (Pseudo Random Binary Sequence, PRBS), an arithmetic sequence, or a geometric sequence. When the indication information is a sequence, the sender 52 may be specifically configured to send the indication information to the second modem through a plurality of data frames, where the number of the plurality of data frames is equal to the number of elements making up the sequence, and the modulation mode fields of the plurality of data frames carry one element making up the sequence, respectively.

It should be noted that each data frame carries only one element.

For example, assuming that the sequence is pre-configured as a PRBS, the sender 52 specifically can consecutively send a first data frame B1, a second data frame B2, a third data frame B3, . . . , and an $n^{th}$ data frame Bn to the second modem, where indication information included in the n data frames may make up a PRBS, that is, PRBS1, where the PRBS1 corresponds to the current working modulation mode of the modem, so that the second modem determines the current working modulation mode of the modem according to the indication information.

For another example, assuming that the sequence is pre-configured as an arithmetic sequence, the sender 52 specifically can consecutively send a first data frame B1, a second data frame B2, a third data frame B3, . . . , and an $n^{th}$ data frame Bn to the second modem, where indication information included in the n data frames may make up an arithmetic sequence, that is, an arithmetic sequence whose step is A, where the arithmetic sequence whose step is A corresponds to the current working modulation mode of the modem, so that the second modem determines the current working modulation mode of the modem according to the indication information.

In this embodiment, a modem generates indication information according to a current working first modulation mode through a processor, so that a sender can send the indication information to a second modem through a data frame. Therefore, the second modem adjusts a current working second modulation mode of the second modem according to the indication information, so that the adjusted second modulation mode is consistent with the first modulation mode. An operator is no longer required to configure the modulation mode of the second modem as a current working modulation mode of a peer modem, that is, the modem. Therefore, the problem of complex operations in the prior art, caused by that an operator configures a modulation mode of a second modem as a current working modulation mode of a peer modem, that is, a modem, can be avoided, and efficiency of network deployment can be improved.

In addition, the technical solution provided by the present invention can effectively ensure reliability of network deployment.

Figure 6:
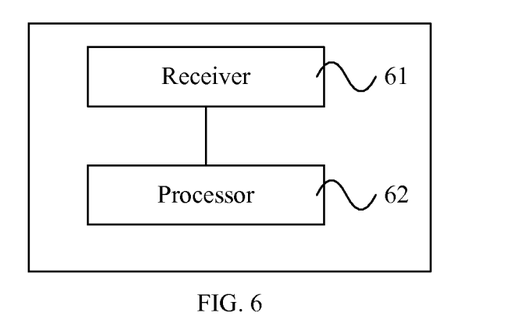
FIG. 6 is a schematic structural diagram of a modem according to another embodiment of the present invention.

FIG. 6 is a schematic structural diagram of a modem (i.e., the second modem) according to another embodiment of the present invention. As shown in FIG. 6, the modem of this embodiment may include a receiver 61 and a processor 62. The receiver 61 is configured to receive indication information sent, through a data frame, by a first modem, and transmit the indication information to the processor 62. The processor 62 is configured to: support two or more modulation modes, where at least one modulation mode among the two or more modulation modes is consistent with the first modulation mode; obtain a current working first modulation mode of the first modem according to the indication information; and adjust a modulation mode of the modem according to the first modulation mode, so that the adjusted modulation mode is consistent with the current working first modulation mode of the first modem.

The indication information may be fixed data or a sequence.

Specifically, if the current working second modulation mode of the modem is consistent with the current working first modulation mode of the first modem, the processor 62 does not need to perform the adjustment operation; and if the current working second modulation mode of the modem is inconsistent with the current working first modulation mode of the first modem, the processor 62 can adjust a modulation mode of the modem, so that the adjusted second modulation mode is consistent with the current working first modulation mode of the first modem.

It may be understood that a modulation mode of the modem in this embodiment needs to include a modulation mode of the first modem. It may be understood that a chip function of the modem needs to include a chip function of the first modem and a chip function of the first modem from a next generation or next several generations.

Specifically, the first modem uses an $N^{th}$ generation modulation chip technology, and the modem uses an $(N+i)^{th}$ generation modulation chip technology. For example, the first modem uses a first generation modulation chip technology and supports only a 256 QAM modulation mode, while the modem uses a second or later generation modulation chip technology and supports a 2048 QAM modulation mode, and also modulation modes such as 256 QAM, 512 QAM, and 1024 QAM. It should be noted that a modulation technology of the modem includes, but is not limited to, FSK, ASK, PSK, TCM, or QAM, and so on. Only QAM is described in this embodiment, which is not used to limit the present invention. Alternatively, for another example, the first modem uses a second generation modulation chip technology, and the modem uses a third or later generation modulation chip technology.

It should be noted that the first modem or the modem may be located in a communication device, for example, a mobile phone or a base station.

Optionally, in a possible implementation manner of this embodiment, the processor 62 may be further configured to select a supportable modulation mode by polling as the modulation mode of the modem before the adjustment.

Specifically, the processor 62 may obtain configured polling information, so that the processor 62 selects a supportable modulation mode by polling as the modulation mode of the modem before the adjustment.

It should be noted that the definition of "selecting a supportable modulation mode by polling" mentioned in this embodiment may be understood as actively selecting a supportable modulation mode periodically, or may also be understood as actively selecting a supportable modulation mode within a specified time.

For example, an operator can pre-configure a supportable modulation mode and configured polling information for a modem according to the type of the modem. For example, when a second generation Modem is used as the modem, the operator can configure a modulation mode of the modem as a modulation mode of a first generation Modem or a modulation mode of the second generation Modem; and the configured polling information is set as a polling interval of 5 minutes.

Optionally, in a possible implementation manner of this embodiment, the indication information may be fixed data, for example, 0X55. When the indication information is fixed data, the receiver 61 may be specifically configured to receive at least one data frame sent by the first modem, and detect a modulation mode field of the at least one data frame to obtain the fixed data, where the modulation mode field of each data frame carries the fixed data.

Optionally, in a possible implementation manner of this embodiment, to avoid the problem of in-band flatness increase caused by periodicity of a field of a fixed value, the indication information may be a sequence. The sequence includes a pseudo random binary sequence (PRBS), an arithmetic sequence, or a geometric sequence. When the indication information is a sequence, the receiver 61 may be specifically configured to receive a plurality of data frames sent by the first modem, and jointly detect modulation mode fields of the plurality of data frames to obtain the sequence, where the number of the plurality of data frames is equal to the number of elements making up the sequence, and the modulation mode fields of the plurality of data frames carry one element making up the sequence, respectively.

It should be noted that each data frame carries only one element.

For example, assuming that the sequence is pre-configured as a PRBS, a first modem specifically can consecutively send a first data frame B1, a second data frame B2, a third data frame B3, . . . , and an $n^{th}$ data frame Bn to the modem, where indication information included in the n data frames may make up a PRBS, that is, PRBS1, where the PRBS1 corresponds to the current working first modulation mode of the first modem, so that the modem determines the current working first modulation mode of the first modem according to the indication information.

For another example, assuming that the sequence is pre-configured as an arithmetic sequence, the first modem specifically can consecutively send a first data frame B1, a second data frame B2, a third data frame B3, . . . , and an $n^{th}$ data frame Bn to the modem, where indication information included in the n data frames may make up an arithmetic sequence, that is, an arithmetic sequence whose step is A, where the arithmetic sequence whose step is A corresponds to the current working first modulation mode of the first modem, so that the modem determines the current working first modulation mode of the first modem according to the indication information.

In this embodiment, a modem receives, with a receiver, indication information sent, through a data frame, by a first modem, so that a processor can adjust a modulation mode of the modem according to the indication information, so that the adjusted modulation mode of the modem is consistent with the current working first modulation mode of the first modem. An operator is no longer required to configure the modulation mode of the modem as a current working modulation mode of a peer modem, that is, the first modem. Therefore, the problem of complex operations in the prior art, caused by that an operator configures a modulation mode of a modem as a current working modulation mode of a peer modem, that is, the first modem, can be avoided, and efficiency of network deployment can be improved. In addition, the technical solution provided by the present invention can effectively ensure reliability of network deployment.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in the form of hardware or a software functional unit in addition to hardware.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present application. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of the present application.

What is claimed is:

1. A method for adjusting a modulation mode, comprising:
generating, by a first modem, indication information according to a current working first modulation mode, wherein the indication information comprises a sequence; and
sending, by the first modem, the indication information to a second modem through a plurality of data frames, to enable the second modem to adjust a second modulation mode of the second modem according to the indication information, to further enable the adjusted second modulation mode to be consistent with the first modulation mode, and to carry the sequence through modulation mode fields of the plurality of data frames, wherein each of the modulation mode fields of the plurality of data frames carries one element making up the sequence and a number of the plurality of data frames equals a number of the elements making up the sequence;
wherein when the second modulation mode of the second modem is currently working, the second modem supports two or more modulation modes, and among the two or more modulation modes, a modulation mode consistent with the first modulation mode is used as the adjusted second modulation mode.

2. The method according to claim 1, wherein the sequence comprises one of a pseudo random binary sequence, an arithmetic sequence, and a geometric sequence.

3. A method for adjusting a modulation mode, comprising:
receiving, by a second modem, indication information sent, through a data frame format, from a first modem, wherein the indication information comprises a sequence and a plurality of data frames;
detecting modulation mode fields of the plurality of data frames to obtain the sequence, wherein a number of the plurality of data frames equals a number of elements making up the sequence, and each of the modulation mode fields of the plurality of data frames carries one element making up the sequence;
obtaining, by the second modem, a first modulation mode of the first modem according to the indication information, wherein the first modulation mode of the first modem is currently working; and
adjusting, by the second modem, a second modulation mode of the second modem according to the first modulation mode, so that the adjusted second modulation mode is consistent with the first modulation mode, wherein when the second modulation mode of the second modem is currently working, the second modem supports two or more modulation modes, and among the two or more modulation modes, a modulation mode consistent with the first modulation mode is used as the adjusted second modulation mode.

4. The method according to claim 3, wherein the sequence comprises one of a pseudo random binary sequence, an arithmetic sequence, and a geometric sequence.

5. A modem, comprising:
a processor and a sender, wherein
the processor is configured to work in a first modulation mode, generate indication information according to the first modulation mode which is currently working, and transmit the indication information to the sender, wherein the indication information comprises a sequence;
the sender is configured to send the indication information to a second modem through a plurality of data frames, to enable the second modem to adjust a second modulation mode of the second modem according to the indication information, to enable the adjusted second modulation mode to be consistent with the first modulation mode, and to carry the sequence of the indication information through modulation mode fields of the plurality of data frames, wherein each of the modulation mode fields of the plurality of data frames carries one element making up the sequence and a number of the plurality of data frames equals a number of elements making up the sequence;
wherein when the second modulation mode of the second modem is currently working, the second modem supports two or more modulation modes, and among the two or more modulation modes, a modulation mode consistent with the first modulation mode is used as the adjusted second modulation mode.

6. The modem according to claim 5, wherein the sequence comprises one of a pseudo random binary sequence, an arithmetic sequence, and a geometric sequence.

7. A modem comprising:
a receiver configured to receive indication information sent, through a data frame format, from a first modem, and transmit the indication information to a processor, wherein the indication information comprises a sequence;
the processor configured to obtain a first modulation mode of the first modem according to the indication information, wherein the first modulation mode of the first modem is currently working;
the processor is further configured to adjust a modulation mode of the modem according to the first modulation mode, so that the adjusted modulation mode is consistent with the first modulation mode of the first modem;
the processor supports two or more modulation modes, where at least one modulation mode among the two or more modulation modes is consistent with the first modulation mode;
the receiver is further configured to receive a plurality of data frames sent by the first modem, and to detect with the processor modulation mode fields of the plurality of data frames to obtain the sequence,
wherein a number of the plurality of data frames equals a number of elements making up the sequence, and each of the modulation mode fields of the plurality of data frames carries one element making up the sequence.

8. The modem according to claim 7, wherein the sequence comprises one of a pseudo random binary sequence, an arithmetic sequence, and a geometric sequence.

* * * * *